(12) United States Patent
Kurahashi et al.

(10) Patent No.: US 6,600,541 B2
(45) Date of Patent: Jul. 29, 2003

(54) LIQUID CRYSTAL DISPLAY

(75) Inventors: Nagatoshi Kurahashi, Mobara (JP); Masahiro Ishii, Mobara (JP); Yoshiaki Nakayoshi, Ooami (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 09/977,352

(22) Filed: Oct. 16, 2001

(65) Prior Publication Data

US 2002/0051101 A1 May 2, 2002

(30) Foreign Application Priority Data

Oct. 27, 2000 (JP) .......................... 2000-328666

(51) Int. Cl.$^7$ ............................... G02F 11/1336
(52) U.S. Cl. ....................... 349/141; 349/111
(58) Field of Search ................... 349/141, 111

(56) References Cited

U.S. PATENT DOCUMENTS 6,097,454 A * 8/2000 Zhang et al. ............... 349/43
6,160,601 A * 12/2000 Sato ............................ 349/138

* cited by examiner

Primary Examiner—James Dudek (57) ABSTRACT

A liquid crystal display device which can prevent light leaks due to the influence of signal lines includes, in each pixel area on a liquid-crystal-side surface of one of substrates disposed in opposition to each other with a liquid crystal interposed therebetween, a switching element to be driven by supply of a scanning signal from a gate signal line, a pixel electrode to be supplied with a video signal from a drain signal line via the switching element, and a counter electrode which causes an electric field to be generated between the counter electrode and the pixel electrode. The counter electrode is formed in a layer overlying the pixel electrode with an insulating film interposed between the counter electrode and the pixel electrode, and a conductive layer is formed in the same layer as the counter electrode and over a signal line which is at least one of the drain signal line and the gate signal line which lie in a layer underlying the insulating film, the conductive layer being superposed on the signal line.

20 Claims, 10 Drawing Sheets

LIQUID CRYSTAL DISPLAY

BACKGROUND OF THE INVENTION

1. Field of the Invention

The present invention relates to a liquid crystal display device and, more particularly, to a liquid crystal display device which is called In-Plane Switching Mode.

2. Description of the Related Art

A liquid crystal display device of the type which is called In-Plane Switching Mode has a construction in which a pixel electrode and a counter electrode are formed in each liquid-crystal-side pixel area of either one of the substrates disposed in opposition to each other with a liquid crystal interposed therebetween, so that the optical transmissivity of the liquid crystal is controlled by a component which is contained in an electric field generated between the pixel electrode and the counter electrode and which is nearly parallel to the substrates.

It has been known that one type of such a liquid crystal display device has a construction in which its pixel electrode and its counter electrode are respectively formed in different layers with an insulating film interposed there between, and either one of the pixel and counter electrodes is formed as a transparent electrode formed in nearly the whole of each pixel area, while the other is formed as plural stripe-shaped electrodes which are disposed in nearly the whole of each pixel are a in such a manner as to be extended in one direct ion and to be juxtaposed in a direction traverse to the one direction.

This kind of art is described in detail in, for example, K. Tarumi, M. Bremer, and B. Shuler, IEICE TRANS. ELECTRON., VOL. E79-C No. 8, pp. 1035–1039, AUGUST 1996.

Incidentally, a so-called active matrix system is applied to such a liquid crystal display device; for example, each of its pixel areas is surrounded by adjacent ones of gate signal lines disposed to be extended in the x direction and to be juxtaposed in they direction and by adjacent ones of drain signal lines disposed to be extended in they direction and to be juxtaposed in the x direction, and each of the pixel areas is provided with a switching element to be driven by the supply of a scanning signal from one of the adjacent gate signal lines, and a pixel electrode to which a video signal is to be supplied from one of the adjacent drain signal lines via this switching element.

However, it has been known that such a liquid crystal display device suffer light leaks which occur by its liquid crystal being driven by electric fields which are generated between its drain signal lines or its gate signal lines and electrodes disposed adjacently thereto.

As a counter measure against this phenomenon, there is a method which blocks light due to such light leaks by means of a black matrix formed on the opposite transparent substrate. However, in this method, the width of the black matrix needs to be ensured to some extent, so that a disadvantage such as a reduction in the aperture ratio of each pixel can not be avoided. Accordingly, a solution using another method has been desired.

A thin film transistor which is a switch element is made of a stacked structure in which a gate electrode connected to a gate signal, a gate insulating film, a semiconductor layer, a drain electrode connected to a drain signal line, and a source electrode connected to a pixel electrode are stacked in that order on the substrate. However, it has been pointed out that electric charge is easily irregularly charged on the side of the surface of the semiconductor layer on which the individual electrodes are formed (this phenomenon is called a back channel), so that non-uniformity occurs in the characteristics of individual thin film transistors.

SUMMARY OF THE INVENTION

The invention has been made in view of the above-described problems, and provides a liquid crystal display device in which light leaks due to the influence of signal lines are prevented.

The invention also provides a liquid crystal display device provided with thin film transistors having stable characteristics in which no back channels occur.

Representative aspects of the invention disclosed in the present application will be described below in brief.

A liquid crystal display device includes, for example, in each pixel area on a liquid-crystal-side surface of one of substrates disposed in opposition to each other with a liquid crystal inter posed there between, a switching element to be driven by supply of a scanning signal from a gate signal line, a pixel electrode to be supplied with a video signal from a drain signal line via the switching element, and a counter electrode which causes an electric field to be generated between the counter electrode and the pixel electrode. The counter electrode is formed in a layer overlying the pixel electrode with an insulating film interposed between the counter electrode and the pixel electrode, and a conductive layer is formed in the same layer as the counter electrode and over a signal line which is at least one of the drain signal line and the gate signal line which lie in a layer underlying the insulating film, the conductive layer being superposed on the signal line.

According to the liquid crystal display device constructed in this manner, the conductive layer can have the function of a light shielding film, and can prevent light leaks due to the influence of signal lines.

In addition, since this light shielding film is formed on a substrate on which the signal lines are formed, the light shielding film can be formed to have a width sufficient to prevent the light leaks, whereby the width can be set to be comparatively small.

In the case where the conductive layer is formed to cover the gate signal line, the conductive layer is also formed to cover the thin film transistor for med to be superposed on the gate signal line (with the insulating film being interposed between the conductive layer and the thin film transistor).

Accordingly, if electric charge is present in the insulating film on the thin film transistor, the distribution of the electric charge can be stabilized by the conductive layer, whereby it is possible to obtain stable characteristics which do not allow back channels to occur in the thin film transistor.

BRIEF DESCRIPTION OF THE DRAWINGS

The invention will become more readily appreciated and understood from the following detailed description of preferred embodiments of the invention when taken in conjunction with the accompanying drawings, in which:

FIG. 4 is across-sectional view taken along line IV—IV of FIG. 3;

DETAILED DESCRIPTION OF THE INVENTION

Embodiments of a liquid crystal display device according to the invention will be described below with reference to the accompanying drawings Embodiment 1

<<Equivalent Circuit>>

Figure 2:
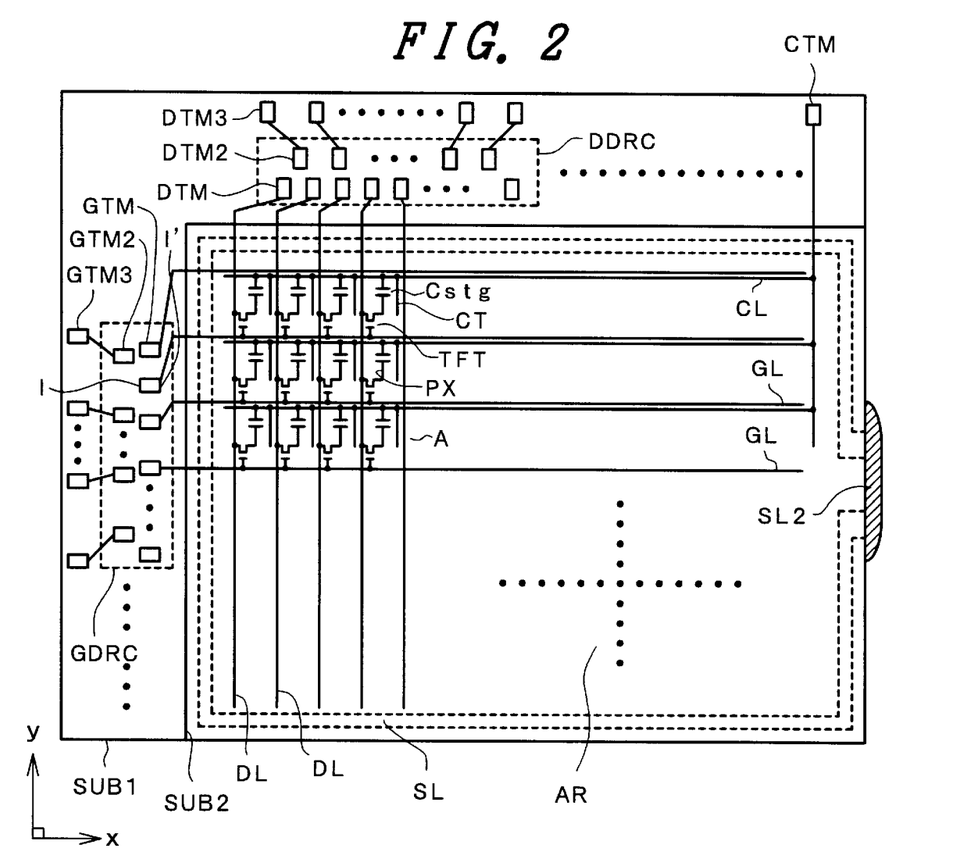
FIG. 2 is an equivalent circuit diagram showing one embodiment of the liquid crystal display device according to the invention.

FIG. 2 is a view showing the equivalent circuit of a liquid crystal display device according to the invention. FIG. 2 is an equivalent circuit diagram which is depicted in accordance with the actual geometrical layout of the liquid crystal display device.

In FIG. 2, there is shown a transparent substrate SUB1. This transparent substrate SUB1 is disposed in opposition to another transparent substrate SUB2 with a liquid crystal interposed therebetween.

Gate signal lines GL and drain signal lines DL are formed on a liquid-crystal-side surface of the transparent substrate SUB1 are. The gate signal lines GL are disposed to be extended in the x direction and to be juxtaposed in the y direction as viewed in FIG. 2, while the drain signal lines DL are insulated from the gate signal lines GL and are disposed to be extended in they direction and to be juxtaposed in the x direction as viewed in FIG. 2. Rectangular are as each of which is surrounded by adjacent ones of the gate signal lines GL and adjacent ones of the drain signal lines DL constitute pixel areas, respectively, and a display part AR is formed by an aggregation of these pixel areas.

Counter voltage signal lines CL, which are disposed in parallel with the respective gate signal lines GL, are formed between the respective gate signal lines GL. Each of these counter voltage signal lines CL is supplied with a signal (voltage) which serves as a reference for a video signal (which will be described later), and is connected to counter electrodes CT (which will be described later) in the corresponding ones of the pixel areas, respectively.

A thin film transistor TFT and a pixel electrode PX are formed in each of the pixel areas. The thin film transistor TFT is driven by the supply of a scanning signal (voltage) from one of the adjacent gate signal line s GL, and a video signal (voltage) is supplied to the pixel electrode PX from one of the adjacent drain signal lines DL via the thin film transistor TFT.

A capacitance element Cstg is formed between the pixel electrode PX and the other of the adjacent gate signal lines GL so that when the thin film transistor TFT is turned off, a video signal supplied to the pixel electrode PX is stored for along time by this capacitance element Cstg.

The pixel electrode PX in each of the pixel areas is arranged to cause an electric field having a component nearly parallel to the transparent substrate SUB1 to be generated between this pixel electrode PX and an adjacent one of the counter electrodes CT, there by controlling the optical transmissivity of the liquid crystal in the corresponding one of the pixel areas.

One end of each of the gate signal lines GL is formed to be extended to one side (in FIG. 2, the left-hand side) of the transparent substrate SUB1, and the extended portion is formed as a terminal part GTM which is connected to a bump of a semiconductor integrated circuit GDRC made of a vertical scanning circuit mounted on the transparent substrate SUB1. In addition, one end of each of the drain signal lines DL is formed to be extended to one side (in FIG. 2, the top side) of the transparent substrate SUB1, and the extended portion is formed as a terminal part DTM which is connected to a bump of a semiconductor integrated circuit DDRC made of a video signal driver circuit made mounted on the transparent substrate SUB1.

The semiconductor integrated circuits GDRC and DDRC in themselves are completely mounted on the transparent substrate SUB1 by a technique which is called COG (chip on glass).

The input-side bumps of each of the semiconductor integrated circuits GDRC and DDRC are respectively connected to terminal parts GTM2 and DTM2 formed on the transparent substrate SUB1. These terminal parts GTM2 and DTM2 are respectively connected via individual inter connection layers to terminal parts GTM3 and DTM3 which are disposed in the peripheral portions of the transparent substrate SUB1 that are respectively closest to different side edges of the transparent substrate SUB1.

The counter voltage signal lines CL are connected in common at their ends (in FIG. 2, their right-hand ends) and are extended to one side of the transparent substrate SUB1 and connected to a terminal part CTM.

The transparent substrate SUB2 is disposed in opposition to the transparent substrate SUB1 in such a manner as to avoid an area in which the semiconductor integrated circuits DDRC and GDRC are mounted, and the area of the transparent substrate SUB2 is smaller than that of the transparent substrate SUB1.

The transparent substrate SUB2 is secured to the transparent substrate SUB1 by a sealing material SL formed in the periphery of the transparent substrate SUB2, and this sealing material SL also has the function of sealing the liquid crystal between the transparent substrates SUB1 and SUB2.

Incidentally, the above description has referred to a liquid crystal display device of the type which uses a COG method, but the invention can also be applied to a liquid crystal display device of the type which uses a TCP method. The TCP method is to form a semiconductor integrated circuit by a tape carrier method, and the outer terminals of the semiconductor integrated circuit are respectively connected to terminal parts formed on the transparent substrate SUB1, while the input terminals of the semiconductor integrated circuit are respectively connected to terminal parts on a printed circuit board which is disposed close to the transparent substrate SUB1.

<<Construction of Pixel>>

Figure 1:
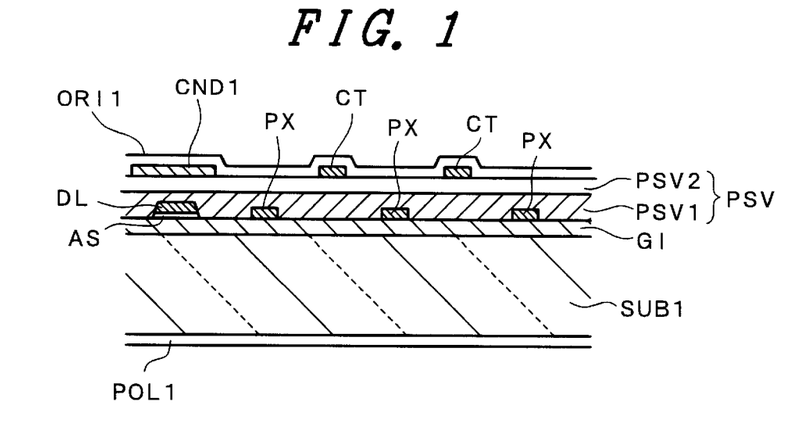
FIG. 1 is a cross-sectional view, taken along line I—I of FIG. 3, of a pixel of a liquid crystal display device according to the invention.
Figure 3:
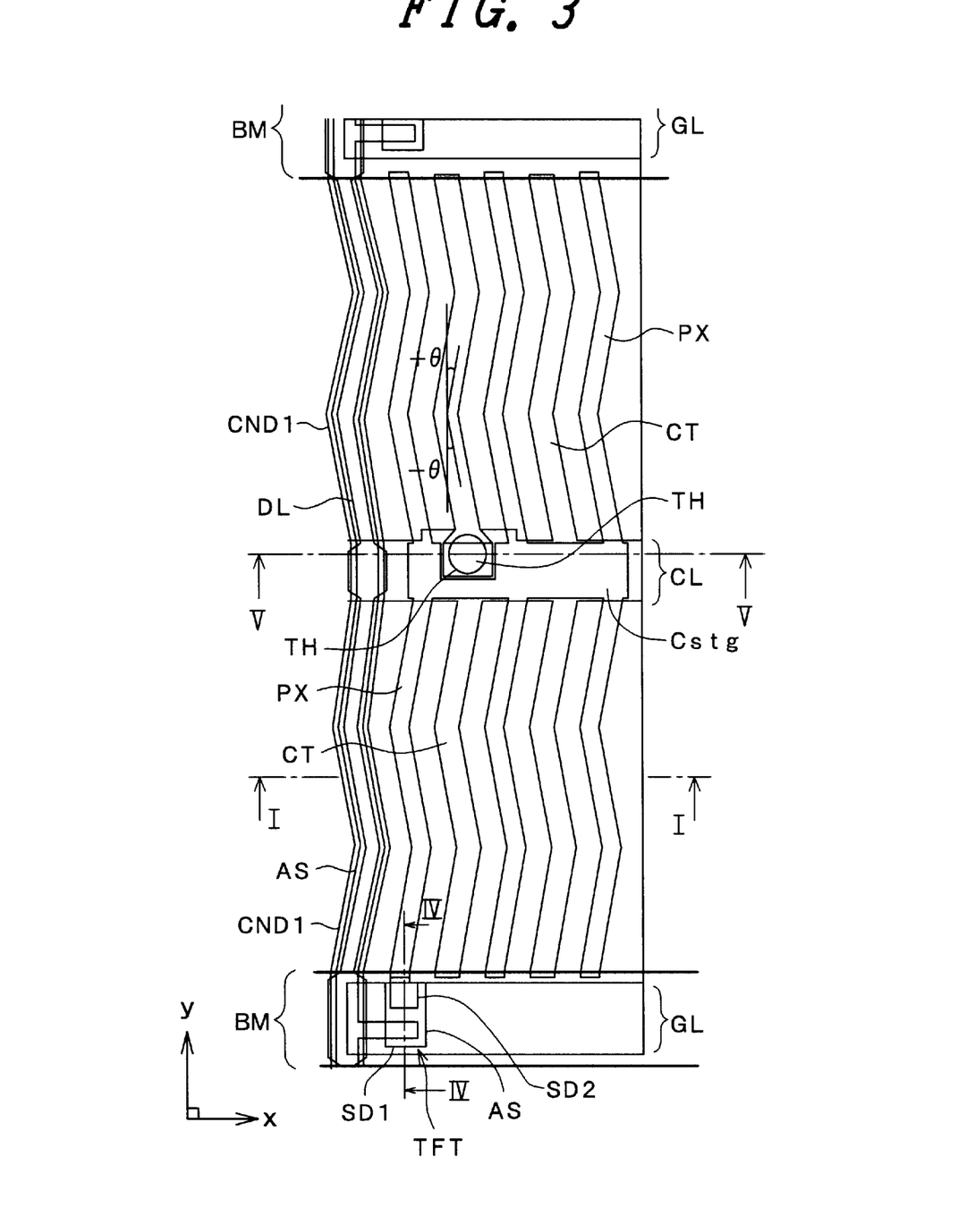
FIG. 3 is a plan view showing one embodiment of a pixel of the liquid crystal display device according to the invention.
Figure 4:
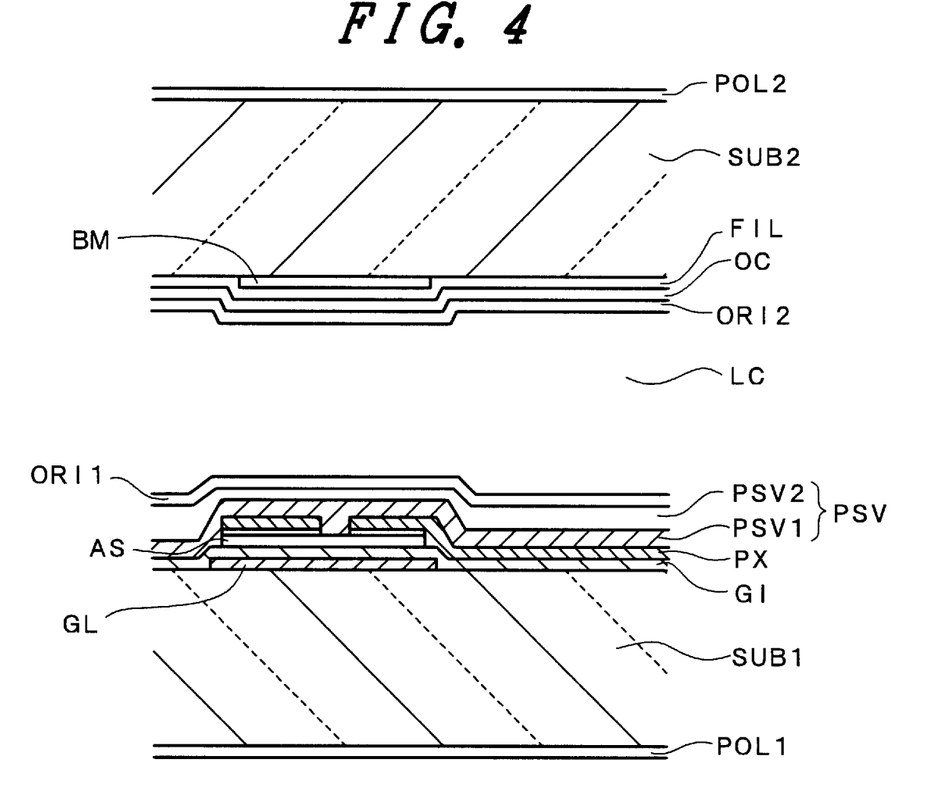
Figure 5:
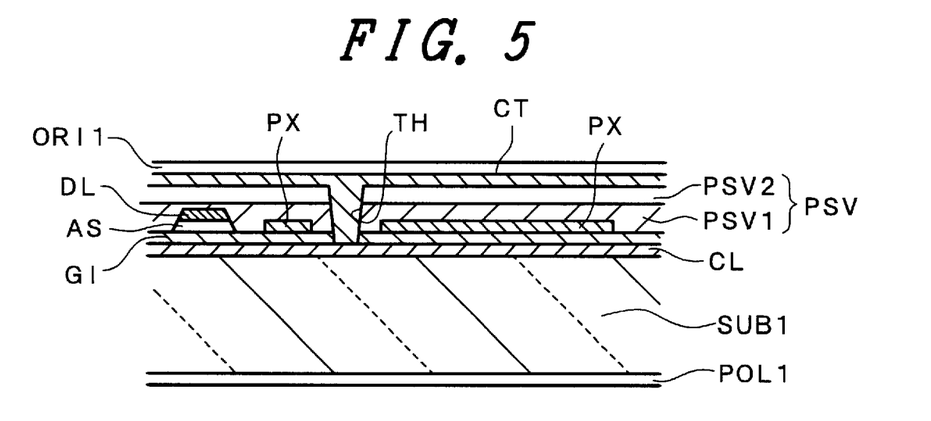
FIG. 5 is a cross-sectional view taken along line V—V of FIG. 3.

FIG. 3 is a view showing the construction of one embodiment of a pixel of the liquid crystal display device according to the invention, and is a plan view showing the portion surrounded by a dotted frame A in FIG. 2. FIG. 1 shows a cross-sectional view taken along line I—I of FIG. 3, FIG. 4 shows a cross-sectional view taken along line IV—IV of FIG. 3, and FIG. 5 shows a cross-sectional view taken along line V—V of FIG. 3.

Incidentally, the liquid crystal display device according to this embodiment is constructed to operate in a normally black mode in which black display is provided when electric fields having components nearly parallel to the transparent substrate SUB1 are not generated between its pixel electrodes PX and its counter electrodes CT, and the normally black mode can be set according to the characteristic of liquid crystal (in this embodiment, for example, a p-type characteristic), the direction of an electric field between each of the pixel electrodes PX and the corresponding one of the counter electrodes CT, the rubbing direction of an alignment layer ORI, and the direction of the axis of transmission of light polarized by a polarizer POL.

Referring first to FIG. 3, a gate signal line GL which is disposed to be extended in the x direction of FIG. 3 is formed on the surface of the transparent substrate SUB1 on the bottom side of the shown pixel area. This gate signal line GL is made of, for example, Cr or a Cr alloy.

This gate signal line GL is formed to surround the pixel area together with a corresponding gate signal line GL (not shown) which is positioned on the top side of the pixel area, a drain signal line DL which will be described later, and a corresponding drain signal line which is positioned on the right-hand side of the pixel area.

A counter voltage signal line CL which runs in parallel with the gate signal lines GL is formed between the gate signal line s GL. This counter voltage signal line CL is formed at the same time that, for example, the gate signal lines GL are formed, and is made of, for example, Cr or a Cr alloy.

In FIG. 2, this counter voltage signal line CL is shown to be disposed close to one of the gate signal lines GL, but in this embodiment, the counter voltage signal line CL is formed to pass through nearly the center of the pixel area. In this case, it is possible to reliably prevent connection between the counter voltage signal line CL and the gate signal lines GL, and it is possible to improve the manufacturing yield factor of the liquid crystal is play device.

An insulating film GI made of, for example, SiN is formed to cover the gate signal line GL and others on the surface of the transparent substrate SUB1 on which the gate signal lines GL and the counter voltage signal lines CL are formed in the above-described manner (refer to FIGS. 1, 4 and 5).

This insulating film GI has the function of an interlayer insulating film between the drain signal lines DL (which will be described later) and the gate signal lines GL as well as the counter voltage signal lines CL, the function of gate insulating films with respect to the thin film transistors TFT which will be described later, and the function of dielectric films with respect to the capacitance elements Cstg which will be described later.

A semiconductor layer AS made of, for example, amorphous Si (a-Si) is formed on the top surface of the portion of the insulating film GI that is superposed on the gate signal line GL.

This semiconductor layer as constitutes a semiconductor layer of the thin film transistor TFT, and a drain electrode SD1 and a source electrode SD2 are formed on the top surface of the semiconductor layer AS, the reby forming a MIS type transistor having a reversed-staggered structure which uses part of the gate signal line GL as its gate electrode.

Incidentally, the semiconductor layer AS is formed not only in an area in which the thin film transistor TFT is formed, but also in an area in which the drain signal line DL which will be described later is formed. The reason for this is to give the semiconductor layer AS as well as the insulating film GI the function of an interlayer insulating film between the drain signal lines DL and the gate signal lines GL as well as the counter voltage signal line s CL.

The drain electrode SD1 of the thin film transistor TFT is formed at the same time as the drain signal line DL, and the source electrode SD2 is formed at the same time as the pixel electrode PX.

Specifically, the drain signal line DL which is extended in the y direction in FIG. 3 is formed on the insulating film GI, and part of the drain signal line DL is formed to be extended onto the top surface of the semiconductor layer AS, whereby the drain electrode SD1 is formed. The drain signal line DL and the drain electrode SD1 are formed of, for example, Cr or a Cr alloy.

In addition, plural (in FIG. 3, three) pixel electrodes PX which are disposed to be extended in they direction and to be juxtaposed in the x direction in FIG. 3 are formed in the central portion of the pixel area except a small-width periphery thereof, and these pixel electrodes PX are electrically connected to one another in the pattern of being connected to one another on the counter voltage signal line CL. These pixel electrodes PX are formed at the same time that the drain signal lines DL are formed, and are made of, for example, Cr or a Cr alloy.

Each of the pixel electrodes PX is of a zigzag shape having several bends along its extension direction. This zigzag shape will be described later together with the counter electrodes.

Among the pixel electrodes PX, the pixel electrode PX closest to the thin film transistor TFT is extended on to the top surface of the semiconductor layer AS at one end, whereby the source electrode SD1 is formed.

A protective film PSV which is made of a stacked structure in which an inorganic film PSV1 made of SiN or the like and an organic film PSV2 made of resin film of the like are stacked in that order is formed to cover the thin film transistor TFT and others on the surface of the transparent substrate SUB1 on which the thin film transistors TFT, the drain signal lines DL and the pixel electrodes PX are formed in the above-described manner (refer to FIGS. 1, 4 and 5). This protective film PSV is formed chiefly in order to prevent the thin film transistor TFT from coming into direct contact with a liquid crystal LC.

The reason why the organic film PSV2 made of resin film or the like is used as a part of the protective film PSV is that since the dielectric constant of the organic film PSV2 is low, it is possible to reduce a capacitance which occurs between an electrode or a signal line positioned to underlie the protective film PSV and an electrode or a signal line positioned to overlie the protective film PSV. The organic film PSV2 can easily be made thick compared to the inorganic film PSV1, and the surface of the organic film PSV2 can easily be made flat compared to the inorganic film PSV1. Accordingly, it is possible to obtain the advantage of preventing application defect of alignment film which occurs due to steps of edge portions of interconnection lines on the transparent substrate SUB1, initial alignment defect due to shadows during rubbing, and switching abnormality (domain) of liquid crystal Plural (in FIG. 3, two) counter electrodes CT which are disposed to be extended in they direction and to be juxtaposed in the x direction in FIG. 3 are formed on the top surface of the protective film PSV, and these counter electrodes CT are formed so that the counter electrodes CT and the pixel electrodes PX are alternately arranged with spaces being interposed between each of the counter electrodes CT and the adjacent ones of the pixel electrodes PX, respectively The counter electrodes CT are formed from a transparent conductive film such as an ITO (Indium-Tin-Oxide) film or an IZO (Indium-Zinc-Oxide) film.

The counter electrodes CT are constructed to be electrically connected in the pattern of being connected to each other in an area which is superposed on the counter voltage signal line CL, and in a portion of this area, the counter electrodes CT are connected to the counter voltage signal line CL via a contact hole TH which is formed in the protective film PSV (the organic film PSV2 and the inorganic film PSV1).

The formation of this contact hole TH is performed above the counter voltage signal line CL so that a reduction in aperture ratio can be avoided. In this case, a connection portion where the pixel electrodes PX are connected to one another is formed in a pattern which avoids a portion where the contact hole TH is formed, in order to prevent interference between the connection portion and the contact hole TH.

Each of the counter electrodes CT is formed in a zigzag shape in which it is extended from one end toward the other end in the state of being bent first in a θ direction (with respect to the y direction in FIG. 3), then in a −θ direction (with respect to the y direction in FIG. 3), and again in the θ direction (with respect to the y direction in FIG. 3). In this zigzag shape, the angle θ is set to be greater than 0 ⊐ and less than 45 ⊐, preferably with in the range of 5 ⊐ to 30 ⊐.

The pixel electrodes PX are bent similarly to the counter electrodes CT, and are formed in a pattern in which if either the pixel electrodes PX or the counter electrodes CT are shifted in an X direction in FIG. 3, both electrodes PX and CT can be superposed on one another.

The reason why the pixel electrodes PX and the counter electrodes CT are formed in this pattern is that this embodiment adopts a so-called multi domain scheme in which domains are formed so that the directions of electric fields to be generated between the pixel electrodes PX and the counter electrodes CT differ from domain to domain, thereby canceling variations in color tone which occur when the display area is viewed in different directions with respect to the display surface of the liquid crystal display device.

In this embodiment, a first conductive layer CND1 which has nearly the same central ax is as the drain signal line DL and is wider than the drain signal line DL is formed over an area in which the drain signal line DL is formed. In other words, the first conductive layer CND1 is formed in the state of completely covering the drain signal line DL without allowing the drain signal line DL to be exposed when the transparent substrate SUB1 is viewed in a direction perpendicular thereto. The first conductive layer CND1 is formed at the same time that the counter electrodes CT are formed, so that the first conductive layer CND1 is made of an ITO film or an IZO film.

The first conductive layer CND1 is held at the same potential as the counter electrodes CT.

Although the first conductive layer CND1 is formed of a transparent conductive layer made of, for example, an ITO film, the first conductive layer CND1 functions as a light shielding film which prevents light leak due to an electric field which drives the liquid crystal in the vicinity of the drain signal line DL.

Specifically, as described previously, this liquid crystal display device is constructed to operate in a normally black mode in which black display is provided when electric fields having components nearly parallel to the transparent substrate SUB1 are not generated between the pixel electrodes PX and the counter electrodes CT. In this construction, above the first conductive layer CND1, a large number of electric fields are generated in a direction nearly perpendicular to the transparent substrate SUB1 and no electric fields having components nearly parallel to the transparent substrate SUB1 are generated, where by black display is provided and the first conductive layer CND1 can be used in place of a light shielding film.

In addition, the first conductive layer CND1 can terminate electric fields generated from the drain signal line DL, and can therefore restrain the electric fields from terminating on the side of the pixel electrode PX adjacent to the drain signal line DL.

The first conductive layer CND1 is at the same potential as the counter electrodes CT, whereby the electric fields from the drain signal line DL can easily be terminated in this first conductive layer CND1. In addition, in this case, the fact that the protective film PSV is constructed as a stacked structure in which the protective film PSV2 made of a resin layer of low dielectric constant is used as its upper layer makes it easy to terminate the electric fields from the drain signal line DL in the first conductive layer CND1.

Owing to this fact, the pixel electrodes PX enable only electric fields based on a video signal transmitted via the thin film transistor TFT to be generated between the pixel electrodes PX and the counter electrodes CT, and electric fields which become noise do not enter from the drain signal line DL, whereby it is possible to realize a construction which can avoid display defect.

In addition, since the first conductive layer CND1 is at the same potential as the counter electrodes CT as described above, the first conductive layer CND1 also functions as a counter electrode CT which causes an electric field to be generated between the counter electrode CT and the pixel electrode PX disposed adjacent there to.

This fact means that if the space of the pixel area and the number of the electrodes PX and CT per pixel area are set in advance, a pair of counter electrodes CT can be disposed outside the pixel area (over the drain signal line DL), whereby the aperture ratio per pixel can be improved.

An alignment film ORI1 which also covers the pixel electrodes PX is formed on the sur face of the transparent substrate SUB1 on which the pixel electrodes PX are formed in this manner. This alignment film ORI1 is a film which is indirect contact with the liquid crystal LC to restrict the initial alignment direction of the molecules of the liquid crystal LC. In this embodiment, the rubbing direction of the alignment film ORI1 coincides with the direction of extension of the drain signal lines DL.

Incidentally, a polarizer POL1 is formed on the surface of the transparent substrate SUB1 opposite to the liquid crystal LC, and the direction of the polarization axis of the polarizer POL1 is the same as or perpendicular to the rubbing direction of the alignment film ORI1.

A black matrix BM is formed on the liquid-crystal-side surface of the transparent substrate SUB2 which is disposed in opposition to the transparent substrate SUB1 constructed in this manner, with the liquid crystal LC being interposed therebetween.

This black matrix BM is formed to improve the contrast of display and to prevent the thin film transistors TFT from being irradiated with external light.

However, since the first conductive layer CND1 over the drain signal line DL has the function of a light shielding film as described previously, the black matrix BM is only provided over the gate signal lines.

In this case, since the black matrix BM does not exist over the drain signal lines DL, it is possible to achieve the advantage that when the transparent substrate SUB2 is to be disposed in opposition to the transparent substrate SUB1, attention needs only to be paid to deviation in the y direction because tolerance against deviation in the x direction is large. In addition, the black matrix BM may only be formed over the thin film transistors TFT and in the peripheries thereof. In this case, it is possible to compatibly ensure sufficient tolerances against upward and downward registrations in the y direction and an improvement in high aperture ratio.

Color filters FIL each having a color common to a respective one of the pixel areas which are disposed to be juxtaposed in the y direction a reformed on the surface of the transparent substrate SUB2 on which the black matrix BM is formed in the above-described manner. The color filters FIL are disposed in the order of, for example, red (R), green (G) and blue (B) in the x direction.

A leveling film OC made of, for example, a resin film is formed to cover the black matrix BM and the color filters FIL, and an alignment film ORI2 is formed on the leveling film OC. The rubbing direction of the alignment film ORI2 is the same as that of the alignment film ORI1 formed on the transparent substrate SUB1.

Incidentally, a polarizer POL2 is formed on the surface of the transparent substrate SUB1 opposite to the liquid-crystal-side surface thereof, and the direction of the polarization axis of the polarizer POL2 is perpendicular to the direction of the polarization axis of the polarizer POL1 formed on the transparent substrate SUB1.

In the above-described embodiment, the pixel electrodes PX are formed of an opaque conductive layer made of, for example, Cr or an Cr alloy. However, it goes without saying that the pixel electrodes PX may be formed of an ITO film or an IZO film similarly to the counter electrodes CT. In this case, it is possible to realize a far greater improvement in aperture ratio.

The organic film PSV2 used in this embodiment has an other function which serves the effect of improving the reliability of the protective film PSV itself. If the protective film PSV is composed of an inorganic film PSV1 alone as in related arts, there are some cases where part of a wiring material flows into the liquid crystal through fine defects resulting from defective coverage of ends of interconnect ion lines and affects the electro-optical characteristics of the liquid crystal. The occurrence of such a defect can be prevented by introducing the organic film PSV2 which can realize good coverage and thick film. For the same reason, even if the pixel electrodes PX and the gate or drain lines are composed of the same material, there is an advantage which can prevent disconnection from being caused in an interconnection line by an etching solution soaking through defects during the etching process of the pixel electrodes PX.

Furthermore, in the case of a construction in which p-ITO is used for the pixel electrodes PX and an Al-containing alloy is used for the gate lines, even if a strong acid such as HBr is used as an etching solution for the pixel electrodes PX, the Al-containing interconnection lines of the gate lines do not suffer corrosion nor disconnection.

In the above description of the embodiment, reference has been made to a liquid crystal display device of the type constructed to operate in a normally black mode. However, it goes without saying that the invention can also be applied to a construction for a normally white mode. In this case, the above-described function can be realized by using an opaque conductive layer made of, for example, Cr or an Cr alloy for the counter electrodes CT as well as the first conductive layer CND1 and a second conductive layer CND2 which are formed at the same time as the counter electrodes CT.

Embodiment 2

Figure 6:
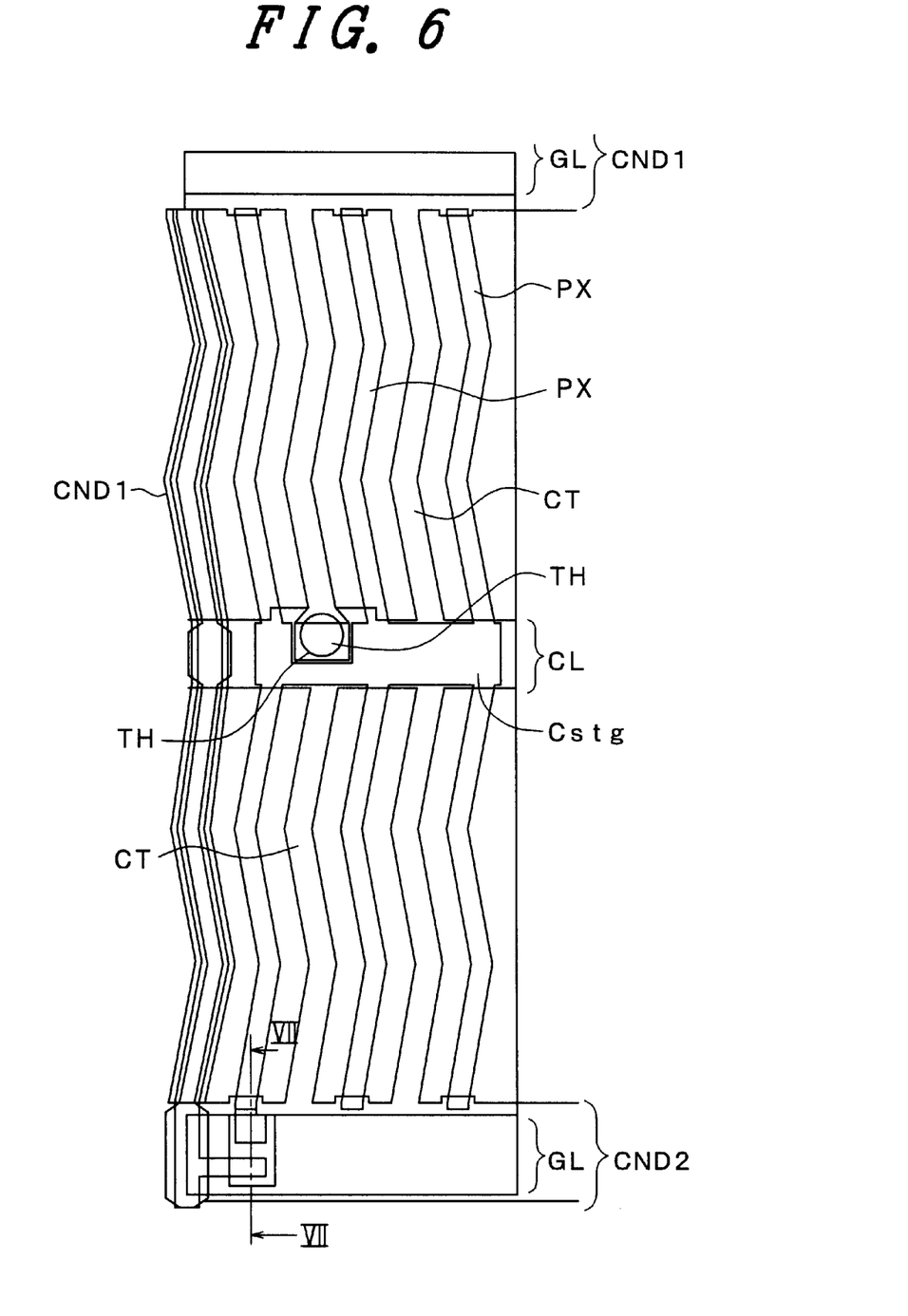
FIG. 6 is a plan view showing another embodiment of a pixel of the liquid crystal display device according to the invention.
Figure 7:
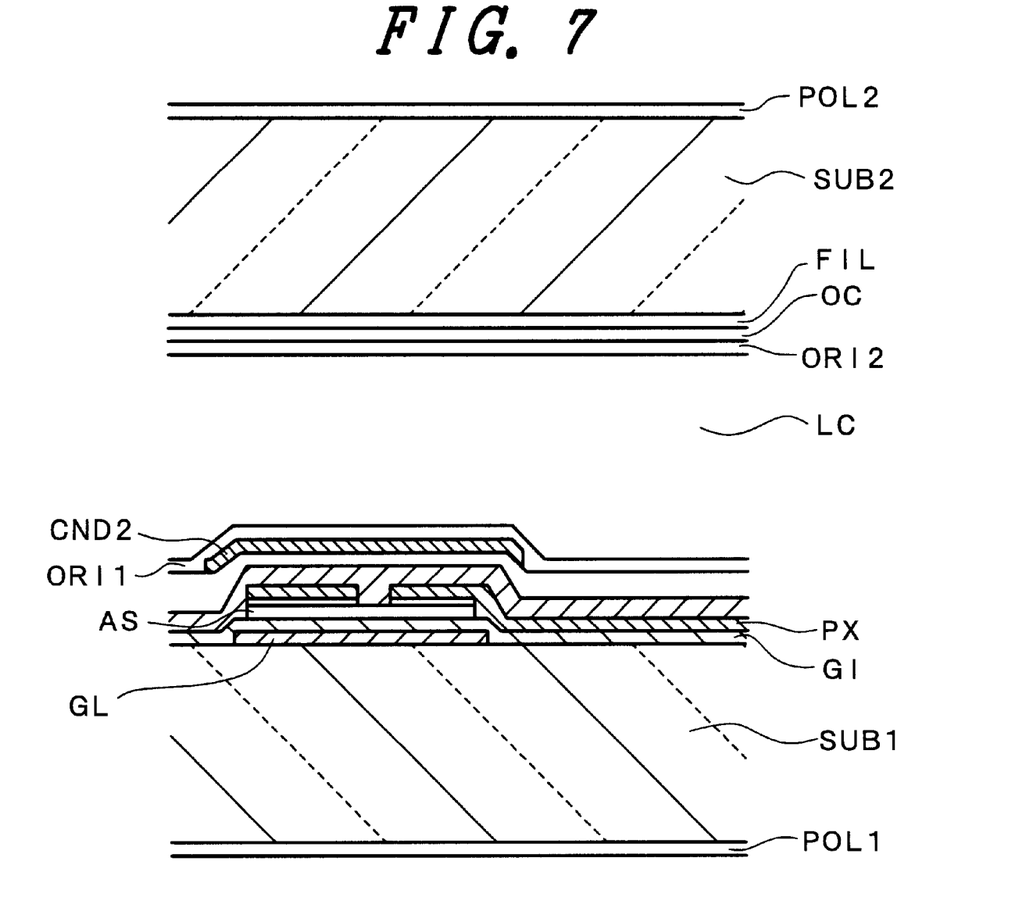
FIG. 7 is a cross-sectional view taken along line VII—VII of FIG. 6.

FIG. 6 is a view showing another embodiment of a pixel of the liquid crystal display device according to the invention, and is a plan view corresponding to FIG. 3. FIG. 7 shows across-sectional view taken along line VII—VII of FIG. 6.

The construction shown in FIG. 6 differs from that shown in FIG. 3 in that the second conductive layer CND2 made of, for example, an ITO film is formed over the gate signal line GL.

The central axis of the second conductive layer CND2 is made nearly coincident with that of the gate signal line GL, and the second conductive layer CND2 is formed to be wider than the gate signal line GL. In other words, the second conductive layer CND2 is formed in the state of completely covering the gate signal line GL without allowing the gate signal line GL to be exposed when the transparent substrate SUB1 is viewed in a direction perpendicular thereto.

The second conductive layer CND2 is formed at the same time that the counter electrodes CT are formed, so that the second conductive layer CND2 is formed integrally with the first conductive layer CND1 formed over the drain signal line DL and is held at the same potential as the counter electrodes CT.

In addition, since the second conductive layer CND2 has the function of a light shielding film, the black matrix BM is not formed on the transparent substrate SUB2.

In other words, the first conductive layer CND1 formed over the drain signal line DL and the second conductive layer CND2 formed over the gate signal line GL have the function of the black matrix BM, and can be made smaller in width than the black matrix BM, whereby it is possible to realize a far greater improvement in aperture ratio.

This is because it is general practice to make the width of the black matrix BM comparatively large since the positional deviation of the black matrix BM must be taken into account when the transparent substrate SUB2 is to be disposed in opposition to the transparent substrate SUB1.

In this construction, the second conductive layer CND2 formed to cover the gate signal line GL, as a result, realizes a construction which covers at least the semiconductor layer AS of the thin film transistor TFT. This is because the semiconductor layer AS of the thin film transistor TFT is formed to be superposed on a part of the gate signal line GL.

In the case where the liquid crystal display device is constructed in this manner, it is possible to restrain the non-uniformity of a so-called back channel as to the thin film transistor TFT, whereby it is possible to uniformize the characteristics of the thin film transistor TFT and the other thin film transistors TFT, thereby preventing display irregularity.

Specifically, in the semiconductor layer AS which constitutes the thin film transistor TFT, a channel layer is formed at a potential to be applied to the gate electrode, and the characteristics of the thin film transistor TFT is determined by a current which flows through the channel layer. If an ionic impurity is introduced into, for example, the protective film PSV by any cause, the channel layer is considered to be affected by the ionic impurity.

This fact results in the disadvantage that the characteristics of the thin film transistor TFT become unstable, and the characteristics of individual thin film transistors TFT easily become non-uniform on the display surface on which multiple thin film transistors TFT are incorporated, so that a cause of display irregularity is induced.

For this reason, by forming the second conductive layer CND2 over the thin film transistor TFT with the protective film PSV and the like interposed there between, it is possible to stabilize electric charge on the surface of the semiconductor layer AS opposite to the gate electrode as well as in the periphery of the surface and it is also possible to restrain the non-uniformity of the characteristics of individual thin film transistors TFT, whereby it is possible to avoid the occurrence of display irregularity.

A sufficient effect can be obtained by forming the second conductive layer CND2 in such a manner as to be su superposed on at least the channel portion of the semiconductor layer AS (the semiconductor layer region between the drain electrode and the source electrode) on the thin film transistor TFT. If the second conductive layer CND2 is formed to have an area slightly extended on all sides, the reliability of the liquid crystal display device can be improved to a further extent.

Embodiment 3

Figure 8:
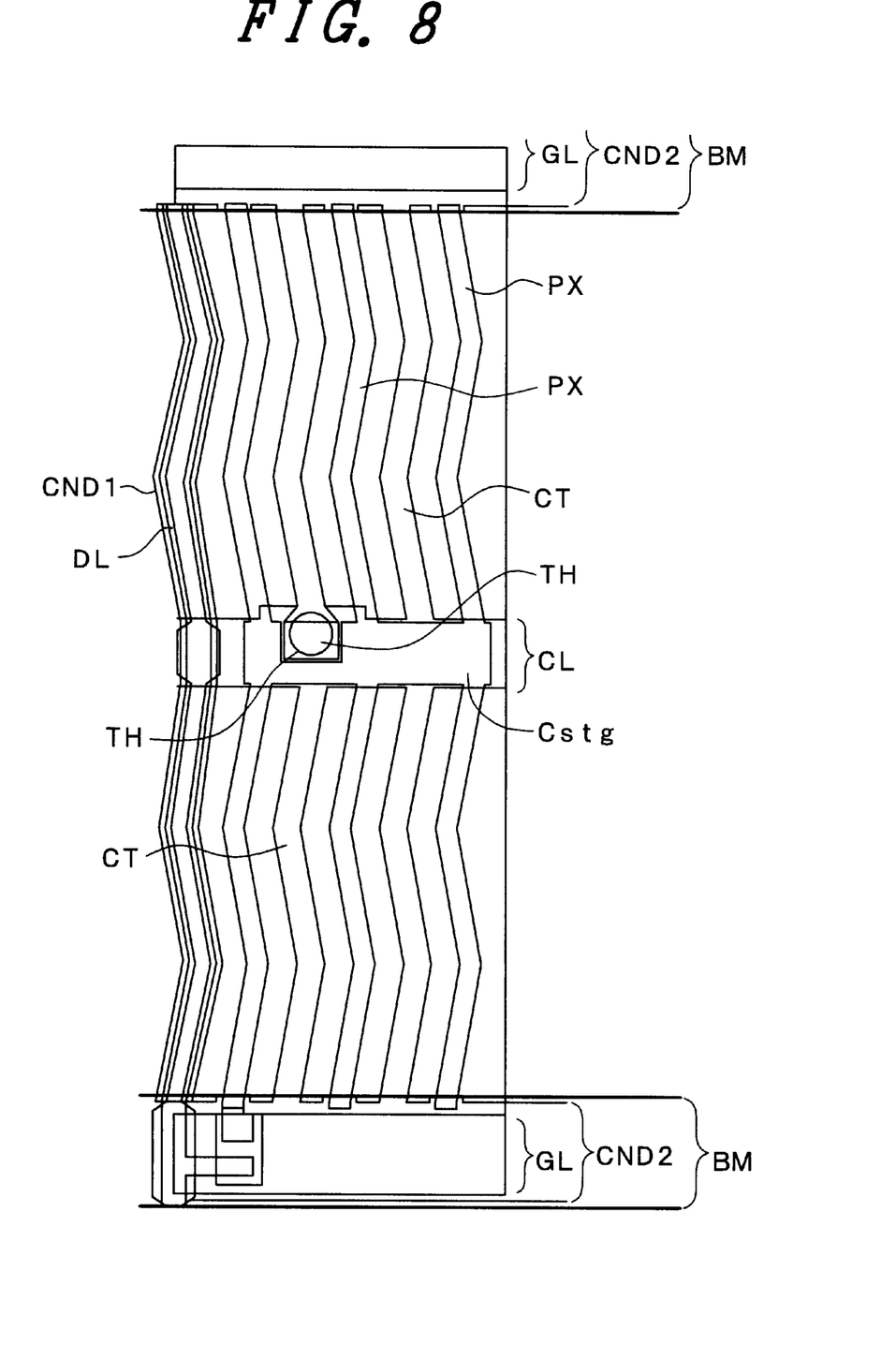
FIG. 8 is a plan view showing another embodiment of a pixel of the liquid crystal display device according to the invention.

FIG. 8 is a view showing another embodiment of a pixel of the liquid crystal display device according to the invention, and FIG. 8 is a view corresponding to FIG. 6.

The construction shown in FIG. 8 differs from that shown in FIG. 6 in that the black matrix BM is formed which covers the gate signal line GL is formed on the liquid-crystal-side surface of the transparent substrate SUB2.

In this case, the respective central axes of the gate signal line GL, the second conductive layer CND2 and the black matrix BM are made nearly coincident with one another, and the widths of the gate signal line GL, the second conductive layer CND2 and the black matrix BM become larger in that order.

In this case, there is the advantage that the width of the black matrix BM can be made greatly small compared to, for example, the case where the second conductive layer CND2 is not formed.

The reason for this is as follows: the black matrix BM and the second conductive layer CND2 constitute a so-called double light shielding construction, and even if a comparatively large positional deviation of the black matrix BM occurs in they direction in FIG. 8 when, for example, the transparent substrate SUB2 is disposed in opposition to the transparent substrate SUB1, the second conductive layer CND2 which projects from the black matrix BM can serve the function of a substantial black matrix.

Embodiment 4

Figure 9:
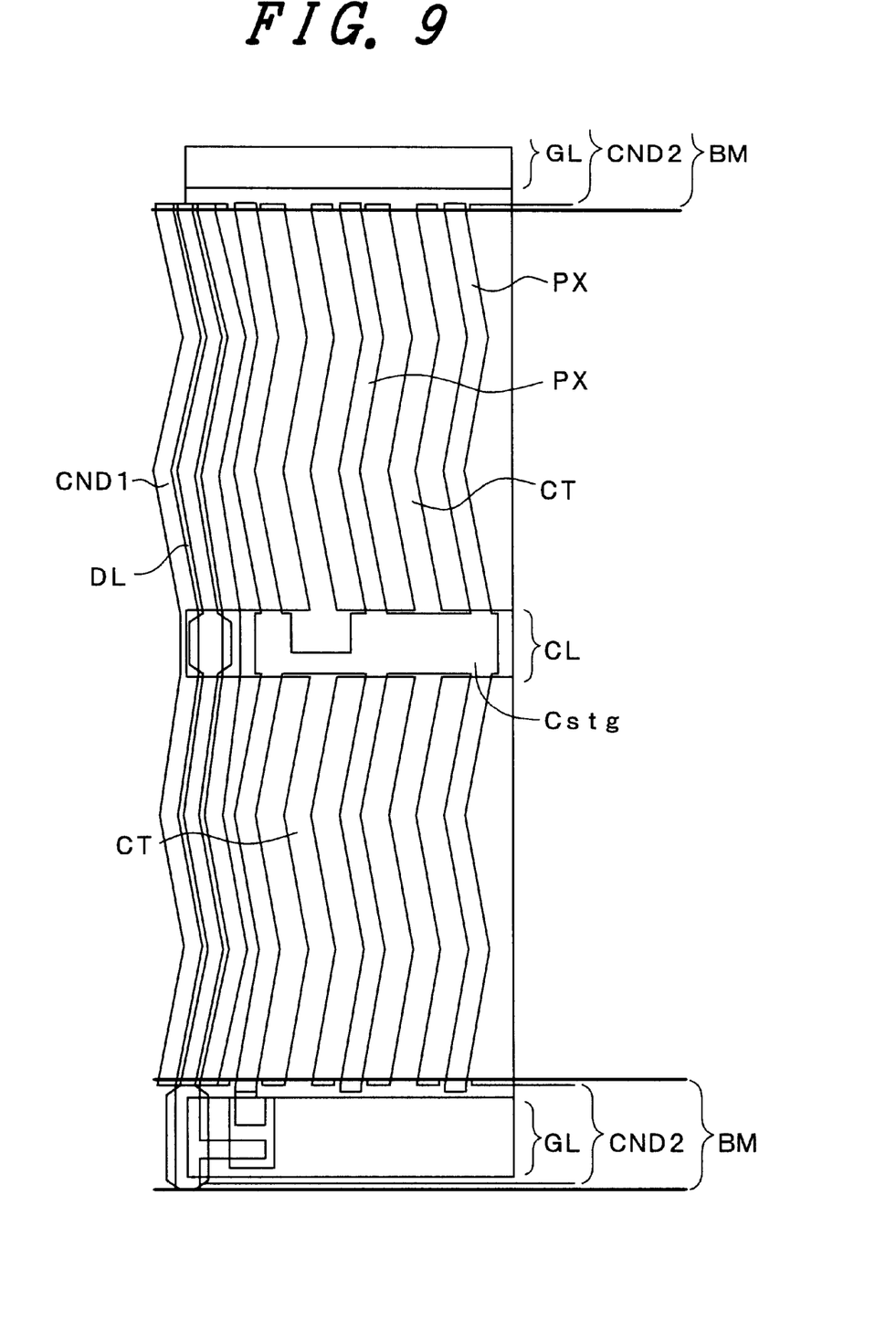
FIG. 9 is a plan view showing another embodiment of a pixel of the liquid crystal display device according to the invention.

FIG. 9 is a view showing another embodiment of a pixel of the liquid crystal display device according to the invention, and FIG. 9 is a view corresponding to FIG. 8.

The construction shown in FIG. 9 differs from that shown in FIG. 8 in that both the counter electrodes CT and the pixel electrodes PX are formed of an opaque conductive layer made of, for example, Cr or a Cr alloy.

Specifically, the counter electrodes CT are formed integrally with the counter voltage signal line CL made of, for example, Cr or a Cr alloy in a layer underlying the insulating film GI, and the pixel electrodes PX are formed integrally with the source electrode SD of the thin film transistor TFT in a layer overlying the insulating film GI.

For this reason, there is the advantage that in the pixel area, there is no need for the connection between underlying electrodes or signal lines and overlying electrodes or signal lines through the insulating film GI (or the protective film PSV), and an area in which a contact hole is to be formed need not be formed in the insulating film GI (or the protective film PSV).

Incidentally, similarly to the construction shown in FIG. 8, the first conductive layer CND1 is formed over the drain signal line DL, the second conductive layer CND2 is formed over the gate signal line GL, and the black matrix BM which covers the gate signal line GL is formed on the liquid-crystal-side surface of the transparent substrate SUB2.

However, as stated previously in connection with each of the above-described embodiments, it goes with out saying that the second conductive layer CND2 which over lies the gate signal line GL or the black matrix BM which covers the gate signal line GL on the liquid-crystal-side surface of the transparent substrate SUB2 may not be formed.

Embodiment 5

Figure 10:
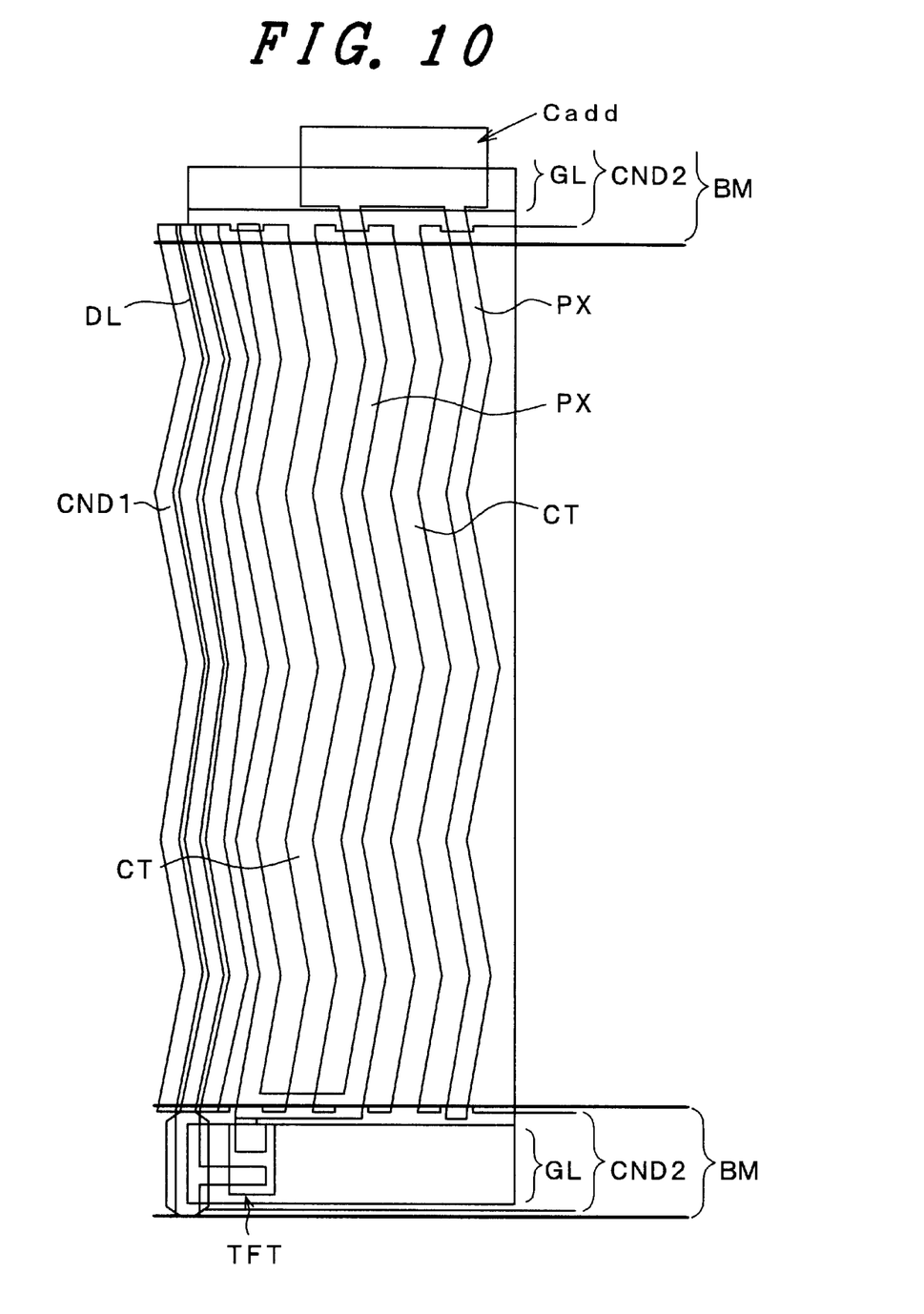
FIG. 10 is a plan view showing another embodiment of a pixel of the liquid crystal display device according to the invention.

FIG. 10 is a view showing another embodiment of a pixel of the liquid crystal display device according to the invention, and FIG. 10 is a view corresponding to FIG. 9.

In the construction shown in FIG. 10, the first conductive layer CND1 which covers the drain signal line GL and the second conductive layer CND2 which covers the gate signal line GL are formed over the protective film PSV, and the first conductive layer CND1 and the second conductive layer CND2 as well as the counter electrodes CT which lie in the same layer are formed of an opaque conductive layer made of, for example, Cr or a Cr alloy.

The first conductive layer CND1 or the second conductive layer CND2 is formed to be extended outwardly from the area of the display part AR so that a counter voltage signal is supplied to the first conductive layer CND1 or the second conductive layer CND2.

Accordingly, this embodiment has a construction in which the counter voltage signal lines CL used in each of the above-described embodiments are not present, whereby a far greater improvement in aperture ratio can be realized.

The pixel electrodes PX are formed of, for example, Cr or a Cr alloy on the insulating film GI, and are a so formed integrally with the source electrode SD2 of the thin film transistor TFT which is formed at the same time as the drain signal line DL made of, for example, Cr or a Cr alloy.

In this construction, the pixel electrodes PX may be formed of a transparent conductive layer such as an ITO film. In this case, the drain signal line DL is formed of Cr, a Cr alloy or the like so that its resistance is made low, and the pixel electrodes PX directly overlap the source electrode SD2 of the thin film transistor TFT which is formed at the same time as the drain signal line DL, so that the pixel electrodes PX are connected to the source electrode SD2.

One end of the pixel electrode PX which is opposite to the thin film transistor TFT which drives the pixel electrode PX has a region of sufficient area which overlaps a gate signal line closest to the one end (the other gate signal line which is disposed with the pixel electrode PX being interposed between the other gate signal line and the gate signal line GL which drives the thin film transistor TFT), and in this area, the one end and the other gate signal line constitute the capacitance element Cadd.

This capacitance element Cadd is composed of two capacitance parts, i.e., a storage capacitance Cstg which uses the stacked structure of the protective films PSV1 and PSV2 as its dielectric film, and a charge-holding capacitance Cadd which uses the insulating film GI as its dielectric film (Cadd≧Cstg).

Similarly to the construction shown in FIG. 9, the first conductive layer CND1 is formed over the drain signal line DL, the second conductive layer CND2 is formed over the gate signal line GL, and the black matrix BM which covers the gate Signal line GL is formed on the liquid-crystal-side surface of the transparent substrate SUB2.

However, as stated previously in connection with each of the above-described embodiments, it goes without saying that the second conductive layer CND2 which over lies the gate signal line GL or the black matrix BM which covers the gate signal line GL on the liquid-crystal-side surface of the transparent substrate SUB2 may not be formed.

Embodiment 6

Figure 11:
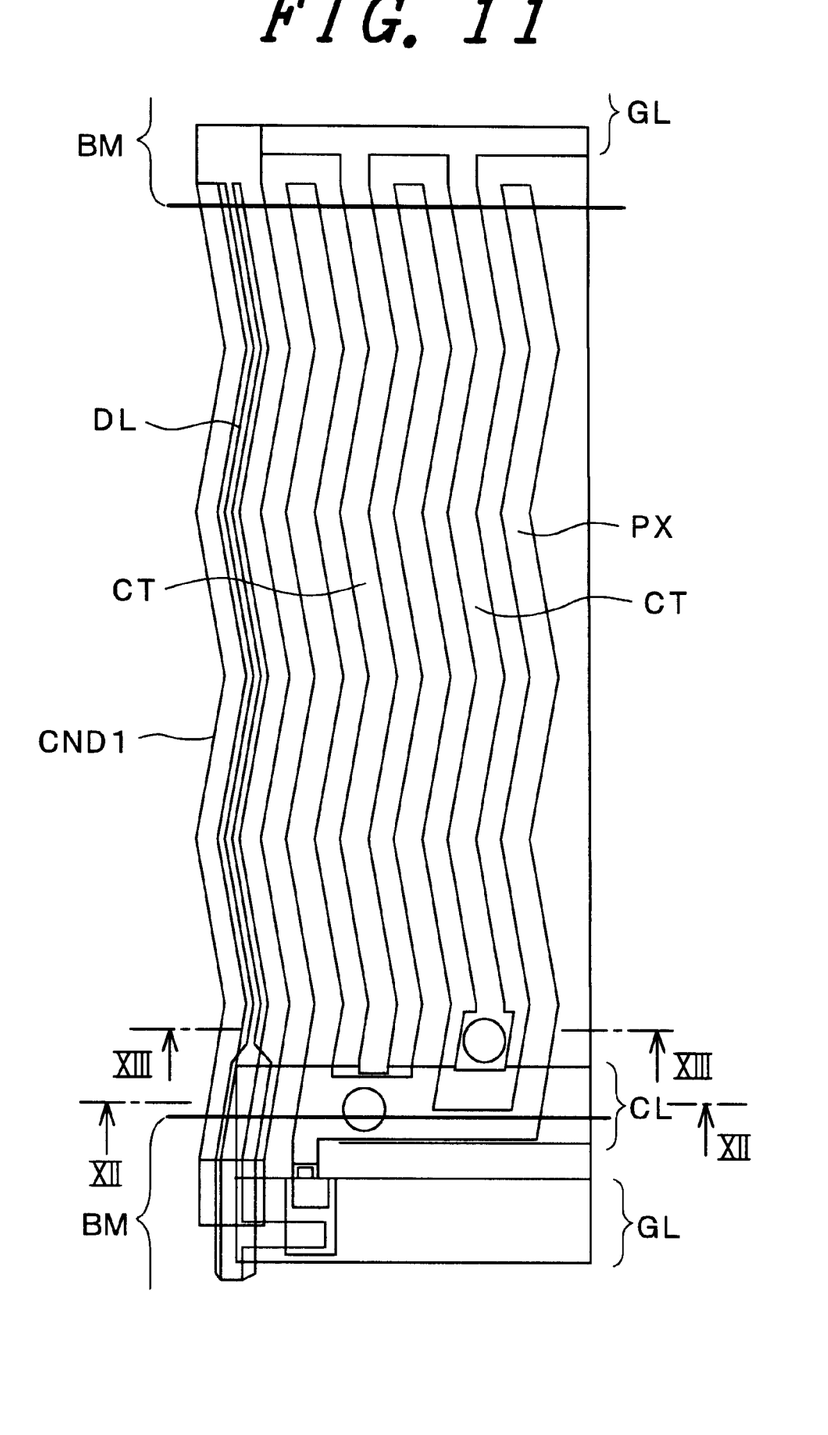
FIG. 11 is a plan view showing another embodiment of a pixel of the liquid crystal display device according to the invention.
Figure 12:
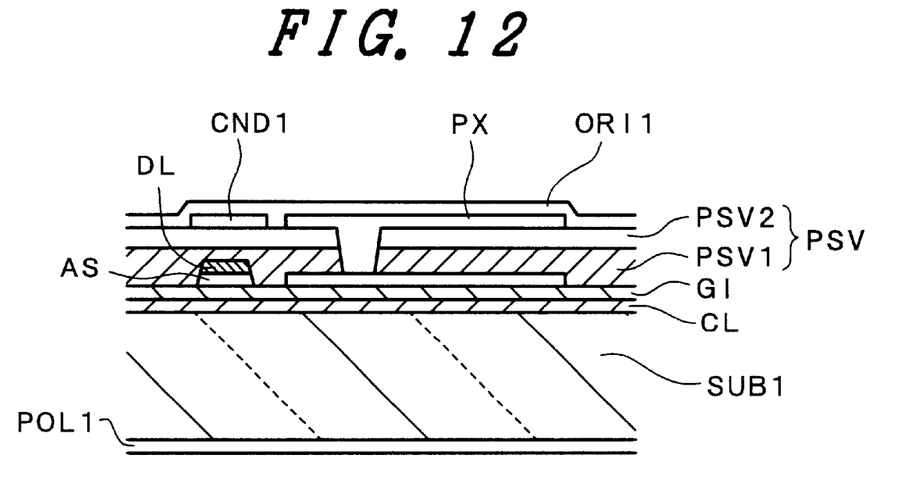
FIG. 12 is a cross-sectional view taken along line XII—XII of FIG. 11.
Figure 13:
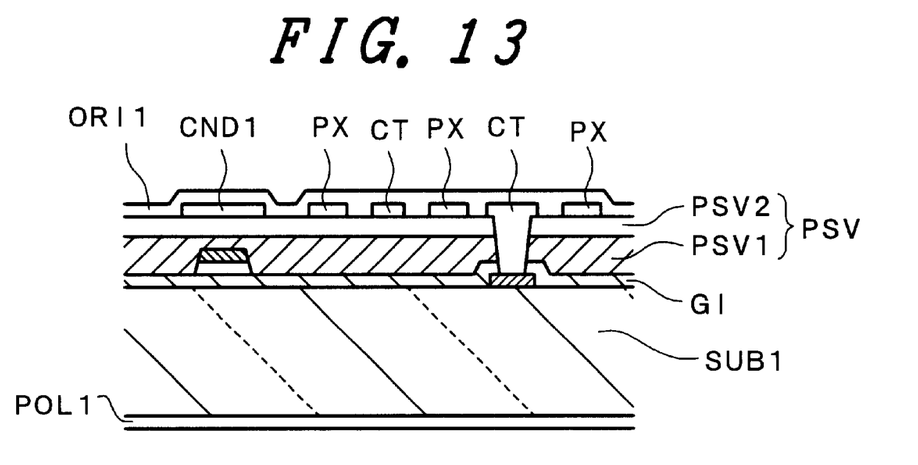
FIG. 13 is a cross-sectional view taken along line XIII—XIII of FIG. 11.

FIG. 11 is a plan view showing another embodiment of a pixel of the liquid crystal display device according to the invention, and is a view corresponding to FIG. 3. FIG. 12 shows a cross-sectional view taken along line XII—XII of FIG. 11, and FIG. 13 shows a cross-sectional view taken along line XIII—XIII of FIG. 11.

The construction shown in FIG. 11 greatly differs from that shown in FIG. 3 in that the counter voltage signal line CL formed in the same layer as the gate signal line GL is formed in proximity to the gate signal line GL and the pixel electrodes PX and the counter electrodes CT are formed in the same layer on the protective film PSV. Each of the pixel electrodes PX and the counter electrodes CT is formed of a transparent conductive layer such as an ITO film or an IZO film.

In other words, the pixel electrodes PX and the counter electrodes CT can be formed in one process, whereby the space between each of the pixel electrodes PX and an adjacent one of the counter electrodes CT can be uniformly formed without the positional deviation between masks, so that it is possible to avoid the occurrence of display irregularity.

The construction of the pixel of this embodiment will be described in more detail. The gate signal line GL is formed to be extended in the x direction in FIG. 11, and is made of, for example, Cr or a Cr alloy.

The counter voltage signal line CL is formed to run in proximity to and in parallel with the gate signal line GL. The counter voltage signal line CL is formed at the same time that, for example, the gate signal line GL is formed, and is made of, for example, Cr or a Cr alloy.

The counter voltage signal line CL has a small portion formed to be extended into the pixel area. This extended portion serves as a contact portion which provides connection between the counter voltage signal line CL and the counter electrode CT (which will be described later) via a through-hole.

The insulating film GI made of, for example, SiN is formed to cover the gate signal line GL and others on the surface of the transparent substrate SUB1 on which the gate signal lines GL and the counter voltage signal lines CL are formed in the above-described manner (refer to FIGS. 12 and 13).

The semiconductor layer AS made of, for example, amorphous Si (a-Si) is formed on the top surface of the portion of the insulating film GI that is superposed on the gate signal line GL.

This semiconductor layer AS is formed not only in an area in which the thin film transistor TFT is formed, but also in an area in which the drain signal line DL which will be described late is formed.

The drain signal line DL which is extended in they direction in FIG. 11 is formed on the insulating film GI, and part of the drain signal line DL is formed to be extended onto the top surface of the semiconductor layer AS, whereby the drain electrode SD1 is formed. The drain signal line DL and the drain electrode SD1 are formed of, for example, Cr or a Cr alloy.

The source electrode SD2 which is formed at the same time as the drain electrode SD1 is extended into the area in which the counter voltage signal line CL is formed, and the source electrode SD2 has a comparatively wide area over the counter voltage signal line CL. This extended portion serves as a contact portion which provides connection between the counter voltage signal line CL and the counter electrode CT (which will be described later) via a through-hole.

The protective film PSV which is made of a stacked structure in which the inorganic film PSV1 made of SiN or the like and the organic film PSV2 made of resin film of the like are stacked in that order is formed to cover the thin film transistor TFT and others on the surface of the transparent substrate SUB1 on which the thin film transistor TFT and the drain signal lines DL are formed in the above-described manner (refer to FIGS. 12 and 13). This protective film PSV is formed chiefly in order to prevent the thin film transistor TFT from coming into direct contact with the liquid crystal LC.

The reason why the organic film PSV2 made of resin film or the like is used as a part of the protective film PSV is that since the dielectric constant of the organic film PSV2 is low, it is possible to reduce a capacitance which occurs between an electrode or a signal line positioned to underlie the protective film PSV and an electrode or a signal line positioned to overlie the protective film PSV.

On the top surface of the protective film PSV, for example, three counter electrodes CT and, for example, two counter electrodes CT are formed to be extended in they direction and to be juxtaposed in the x direction in FIG. 11, and the pixel electrodes PX and the counter electrodes CT are formed to be alternately arranged with spaces being interposed between each of the counter electrodes CT and the adjacent ones of the pixel electrodes PX, respectively. The pixel electrodes PX and the counter electrodes CT are formed from a transparent conductive film such as an ITO film or an IZO film.

A The pixel electrodes PX are connected in common to one another at their ends closer to the thin film transistor TFT, and are, in this portion, connected to the extended portion of the source electrode SD2 of the thin film transistor TFT through the through-hole formed in the protective films PSV2 and PSV1.

In addition, the counter electrodes CT are connected in common at their ends on the side of the pixel area opposite to the thin film transistor TFT, and one of the counter electrodes CT is, at one end closer to the thin film transistor TFT, connected to the extended portion of the counter voltage signal line CL through the through-hole formed in the protective films PSV2 and PSV1.

In addition, the first conductive layer CND1 which has nearly the same central axis as the drain signal line DL and is wider than the drain signal line DL is formed over an area in which the drain signal line DL is formed, at the same time as the formation of the pixel electrodes PX and the counter electrodes CT. The first conductive layer CND1 is held at the same potential as the counter electrodes CT.

Although the first conductive layer CND1 is formed of a transparent conductive layer made of, for example, an ITO film, the first conductive layer CND1 functions as a light shielding film which prevents light leak due to an electric field which drives the liquid crystal in the vicinity of the drain signal line DL.

Incidentally, the construction of this embodiment is such that the second conductive layer CND2 is not formed on the gate signal line GL, but it goes without saying that the second conductive layer CND2 may be formed.

In addition, it is a matter of course that in the case where the second conductive layer CND2 is formed, the black matrix BM on the transparent substrate SUB2 may not be formed.

As is apparent from the foregoing description, in accordance with the liquid crystal display device according to the invention, it is possible to prevent light leaks due to the influence of signal lines.

In addition, it is possible to provide a thin film transistor having stable characteristics in which no back channel occur.

What is claimed is:

1. A liquid crystal display device comprising, in each pixel area on a liquid-crystal-side surface of one of substrates disposed in opposition to each other with a liquid crystal interposed therebetween:
    a switching element to be driven by supply of a scanning signal from a gate signal line;
    a pixel electrode to be supplied with a video signal from a drain signal line via the switching element; and
    a counter electrode which causes an electric field to be generated between the counter electrode and the pixel electrode,
    the counter electrode being formed in a layer overlying the pixel electrode with an insulating film interposed between the counter electrode and the pixel electrode,
    a conductive layer being formed in the same layer as the counter electrode and over a signal line which is at least one of the drain signal line and the gate signal line which lie in a layer underlying the insulating film, the conductive layer being superposed on the signal line.

2. A liquid crystal display device according to claim 1, wherein each of the pixel electrode and the counter electrode is made of plural electrodes disposed to be extended in an extension direction of the drain signal line and to be juxtaposed in a direction perpendicular to the extension direction, two of the plural electrodes of the pixel electrode being respectively formed at opposite extreme positions adjacently to the drain signal line.

3. A liquid crystal display device according to claim 1, wherein the conductive layer has nearly the same central axis as the signal line, and has a width equal to or greater than that of the signal line.

4. A liquid crystal display device according to claim 1, wherein the insulating film formed in a layer underlying the counter electrode is formed of a resin film.

5. A liquid crystal display device according to claim 1, wherein the counter electrode is formed of a transparent conductive layer, and the conductive layer is also formed of a transparent conductive layer.

6. A liquid crystal display device according to claim 1, wherein the conductive layer is electrically connected to the counter electrode.

7. A liquid crystal display device according to claim 1, wherein the liquid crystal display device is in a normally black mode which provides black display when an electric field is not being generated between the pixel electrode and the counter electrode.

8. A liquid crystal display device comprising, in each pixel area on a liquid-crystal-side surface of one of substrates disposed in opposition to each other with a liquid crystal interposed therebetween:
    a thin film transistor to be driven by supply of a scanning signal from a gate signal line;
    a pixel electrode to be supplied with a video signal from a drain signal line via the thin film element; and
    a counter electrode which causes an electric field to be generated between the counter electrode and the pixel electrode,
    the counter electrode being formed in a layer overlying the pixel electrode with an insulating film interposed between the counter electrode and the pixel electrode,
    a conductive layer being formed in the same layer as the counter electrode and over at least a semiconductor layer of the thin film transistor which lie in a layer underlying at least the insulating film, the conductive layer being superposed on the semi conductor layer.

9. A liquid crystal display device according to claim 8, wherein the thin film transistor is made of a stacked structure in which a gate electrode connected to the gate signal, a gate insulating film, the semiconductor layer, a drain electrode connected to the drain signal line, and a source electrode connected to the pixel electrode are stacked in that order on the one of the substrates.

10. A liquid crystal display device according to claim 8, wherein the counter electrode is made of a transparent conductive layer, and the conductive layer is made of the same material as the counter electrode.

11. A liquid crystal display device according to claim 8, wherein the conductive layer is electrically connected to the counter electrode.

12. A liquid crystal display device comprising, in each pixel area on a liquid-crystal-side surface of one of substrates disposed in opposition to each other with a liquid crystal interposed therebetween:
    a switching element to be driven by supply of a scanning signal from a gate signal line;
    a pixel electrode to be supplied with a video signal from a drain signal line via the switching element; and
    a counter electrode which causes an electric field to be generated between the counter electrode and the pixel electrode,
    the counter electrode being formed in a layer overlying the pixel electrode with an insulating film interposed between the counter electrode and the pixel electrode,
    a first conductive layer being formed in the same layer as the counter electrode and over a signal line which is at least one of the drain signal line and the gate signal line which lie in a layer underlying at least the insulating film,
    a second conductive layer being formed to be superposed on at least a semiconductor layer of at least a thin film transistor which lies in a layer underlying at least the insulating film.

13. A liquid crystal display device according to claim 12, wherein the thin film transistor is made of a stacked structure in which a gate electrode connected to the gate signal, a gate insulating film, the semiconductor layer, a drain electrode connected to the drain signal line, and a source electrode connected to the pixel electrode are stacked in that order on the one of the substrates.

14. A liquid crystal display device according to claim 12, wherein the counter electrode is made of a transparent conductive layer, and the first and second conductive layers are made of the same material as the counter electrode.

15. A liquid crystal display device according to claim 12, wherein the first and second conductive layers are electrically connected to the counter electrode.

16. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film element; and a counter electrode which causes an electric field to be generated between the counter electrode and the pixel electrode, the thin film transistor being made of a stacked structure in which the gate signal line, a first insulating film, a semiconductor layer and electrodes respectively connected to the drain signal line and the pixel electrode are stacked in that order, the semiconductor layer being superposed on an area in which the gate signal line is formed, the counter electrode being formed in a layer overlying the pixel electrode with a second insulating film which covers the thin film transistor being interposed between the counter electrode and the pixel electrode, a conductive layer being formed in the same layer as the counter electrode and being disposed to cover the signal line which lies in a layer underlying at least the second insulating film and the first insulating film.

17. A liquid crystal display device according to claim 16, wherein the thin film transistor is made of an ITO film or an IZO film.

18. A liquid crystal display device according to claim 17, wherein the conductive layer is at the same potential as the counter electrode.

19. A liquid crystal display device according to claim 17, wherein the liquid crystal display device is in a normally black mode which provides black display when an electric field is not being generated between the pixel electrode and the counter electrode.

20. A liquid crystal display device according to claim 18, crystal display device is in a normally black mode which provides black display when an electric field is not being generated between the pixel electrode arid the counter electrode.

* * * * *